Nov. 8, 1960　　　　　P. RICHARTZ　　　　　2,959,091
MOTION PICTURE CAMERA
Filed May 7, 1957　　　　　　　　　　　　　　　　4 Sheets-Sheet 1

Inventor:
Paul Richartz
By Robert F. Miehle, Jr. Atty.

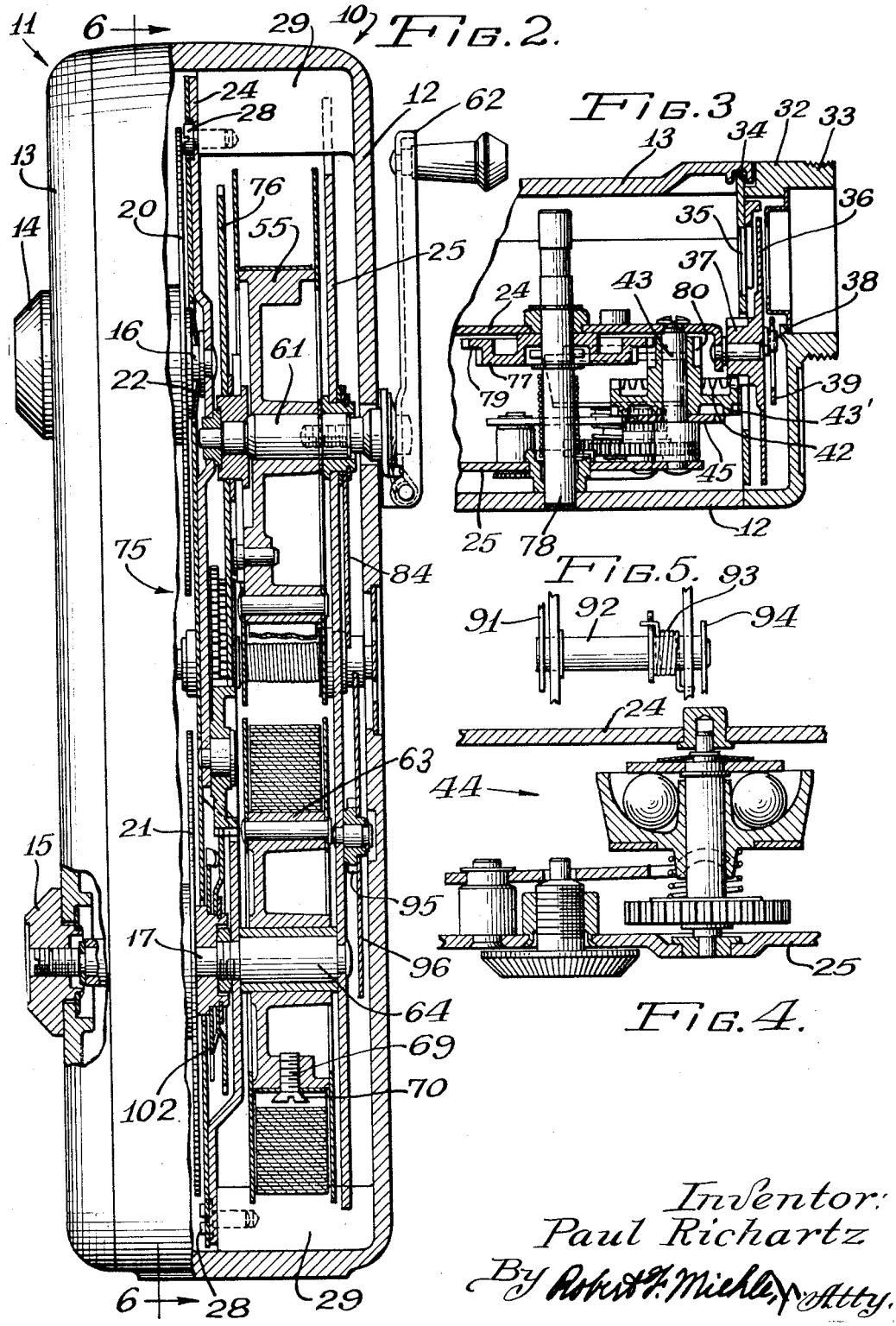

Nov. 8, 1960 P. RICHARTZ 2,959,091
MOTION PICTURE CAMERA
Filed May 7, 1957 4 Sheets-Sheet 3

Inventor:
Paul Richartz
By Robert F. Miehle, Atty.

Nov. 8, 1960 P. RICHARTZ 2,959,091
MOTION PICTURE CAMERA
Filed May 7, 1957 4 Sheets-Sheet 4

Inventor:
Paul Richartz,
By Robert F. Mieller, Atty.

United States Patent Office 2,959,091
Patented Nov. 8, 1960

2,959,091

MOTION PICTURE CAMERA

Paul Richartz, Lincolnwood, Ill., assignor to Bell & Howell Company, Chicago, Ill., a corporation of Illinois Filed May 7, 1957, Ser. No. 657,522

16 Claims. (Cl. 88—18)

This invention relates, generally, to cameras and it has particular relation to motion picture cameras.

Among the objects of this invention are: To provide for driving the film feeding and exposing mechanism of a motion picture camera by means of a spring strip as it unwinds from one hub and winds onto another hub; to prevent further unwinding of the spring strip from either hub when it has been unwound therefrom a predetermined extent; to stop the film exposing mechanism in the closed position when the spring strip is prevented from unwinding from one hub in the discharging direction; to indicate the degree that the spring strip is wound on one hub; and to mount the camera mechanism in a housing having a window through which can be seen the spring wind indicator and a film indicator.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 2 is a view, partly in elevation and partly in vertical section, taken generally along the line 2—2 of Figure 1 and showing further details of construction;

Figure 3 is a horizontal sectional view taken generally along the line 3—3 of Figure 1;

Figure 4 is an inclined sectional view taken generally along the line 4—4 of Figure 1;

Figure 5 is an elevational view taken looking generally along the line 5—5 of Figure 1 and showing the mounting for the film finger and operating spring;

Figure 1:
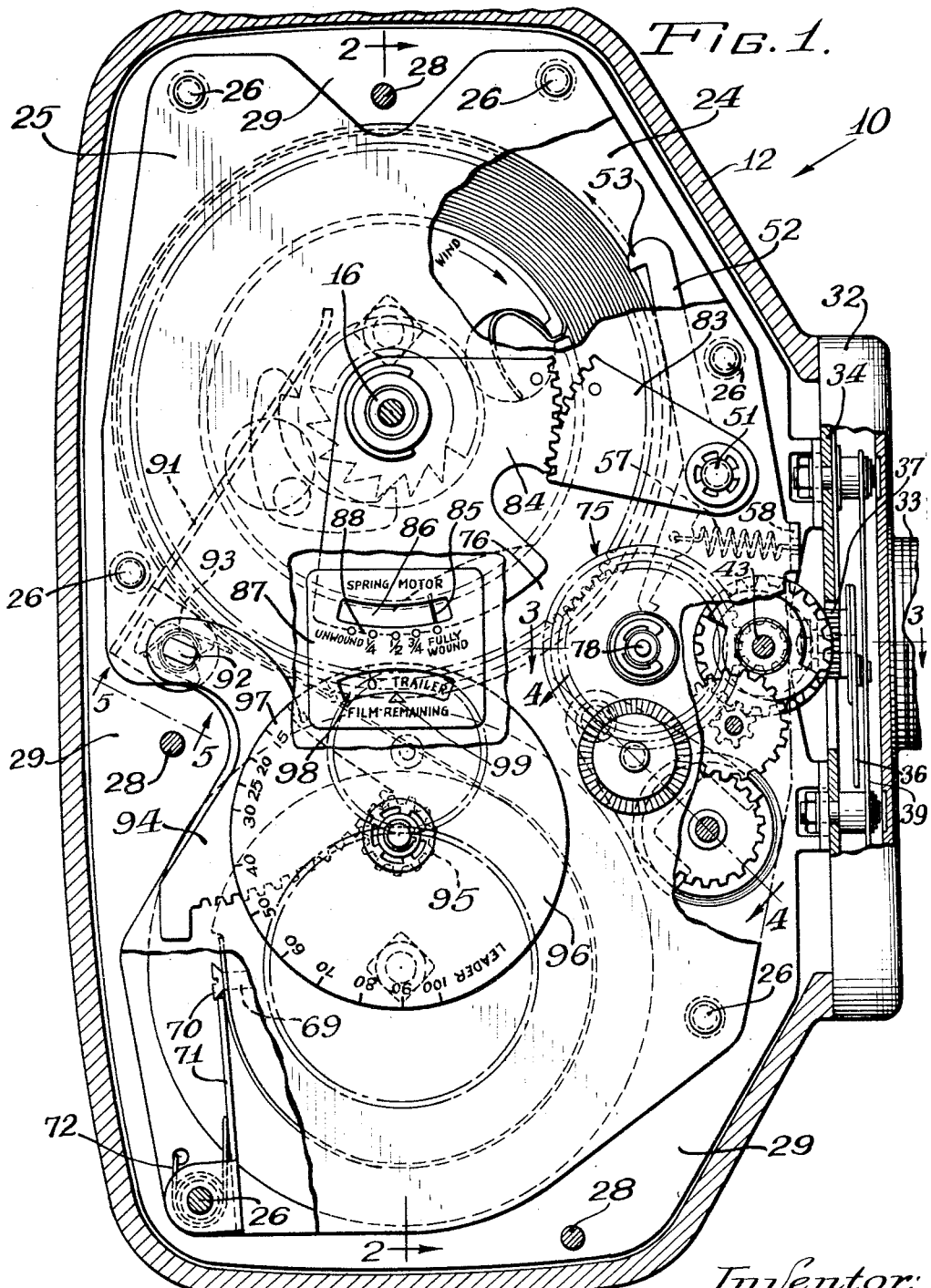
Figure 1 is a view, partly in side elevation and partly in section, showing a motion picture camera in which the present invention is embodied.
Figure 6:
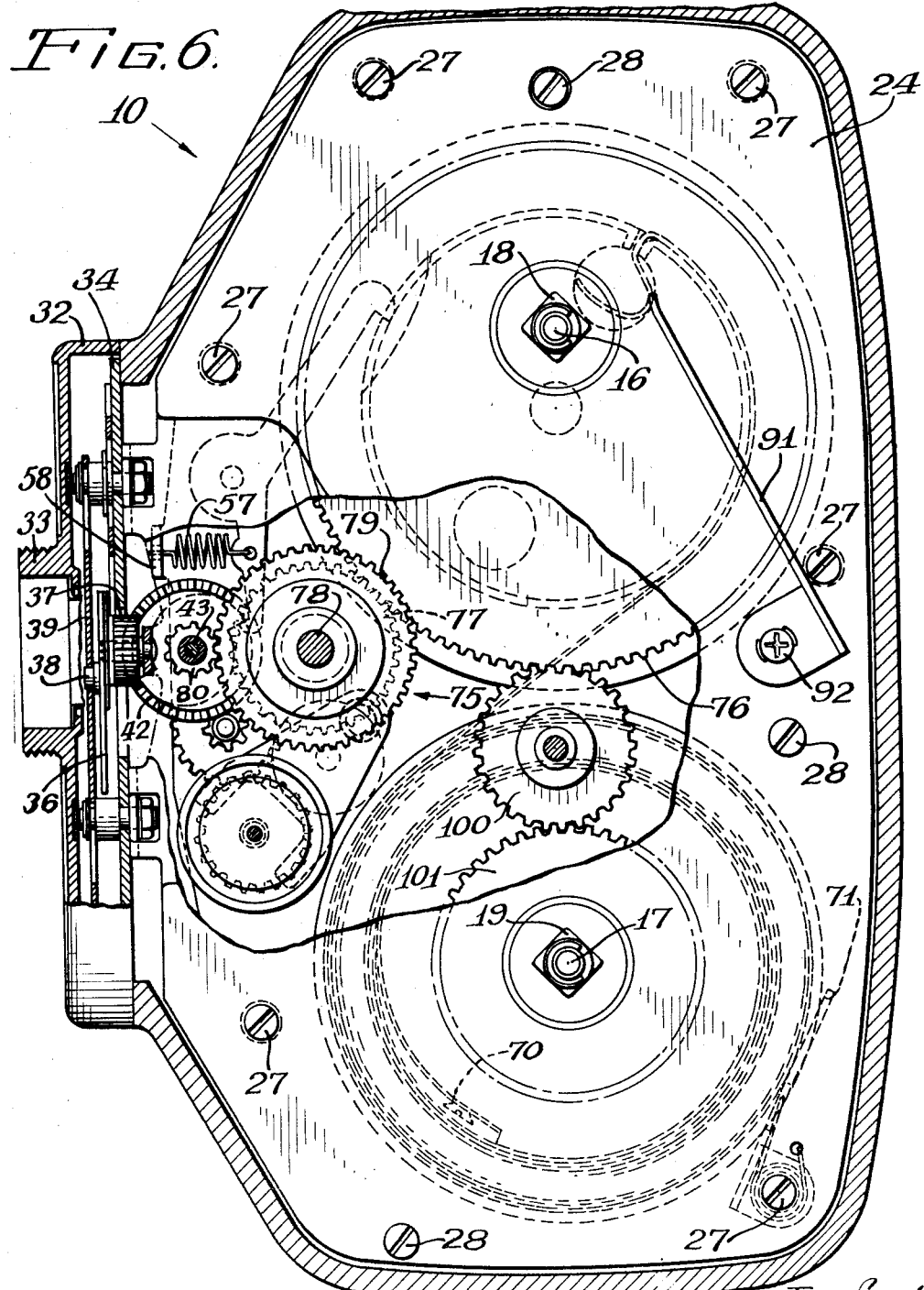
Figure 6 is a vertical sectional view taken generally along the line 6—6 of Figure 2, certain parts being shown in elevation.

Referring now particularly to Figures 1, 2 and 6 of the drawings it will be observed that the reference character 10 designates, generally, a motion picture camera in which the present invention is embodied. A housing, shown generally at 11, provides a suitable light tight enclosure for the camera operating mechanism and film. The housing 11 includes a casing section 12 which is generally pan shaped and is arranged to be closed by a removable cover 13 which is held in place by thumb nuts 14 and 15 which are threaded on vertically spaced studs 16 and 17. As will appear hereinafter, the camera is unloaded and reloaded by removing the thumb nuts 14 and 15 to permit removal of the cover 13. Mounted on the upper stud 16 is an upper film spindle 18 while a lower film spindle 19 is carried by the lower stud 17, Figure 6. An upper film reel 20, Figure 2, can be telescoped over the upper film spindle 18. The unexposed film is carried by the upper film reel 20 and is arranged to be wound on a lower film reel 21 which can be telescoped over the lower film spindle 19. A drag spring 22 provides sufficient friction for the upper film reel 20 to prevent too rapid unwinding of the unexposed film therefrom.

The mechanism within the housing 11 is supported principally by a central plate 24 and an outer plate 25 which are spaced apart by pillars 26. As shown in Figure 6, the central plate 24 is secured to the pillars 26 and thereby to the outer plate 25 by screws 27. Additional screws 28 serve to secure the central plate 24 to bosses 29 which are formed integrally with the casing section 12 of the housing 10.

Extending vertically along one side of the casing section 12 is a film chamber 32, Figures 1 and 6, on which a lens mount 33 is provided, the lens assembly not being shown. Within the film chamber 32 is a plate 34 which is suitably secured to the central plate 24 and which is provided with an aperture 35, Figure 3, for exposing the film as it passes downwardly and rearwardly of the plate 34. A shutter 36 is arranged to overlie the aperture 35 and is rotatable about a horizontal axis to expose the successive frames of the film in a well known manner. Mounted for movement conjointly with the shutter 36 is a pinion 37. Also a pin 38 is eccentrically mounted with respect to the axis of rotation of the shutter 36 and it is arranged to engage a reciprocating shuttle 39 that serves to advance the film, frame by frame, in synchronism with the operation of the shutter 36 in uncovering the aperture 35.

In order to rotate the shutter 36 and operate the shuttle 39 a crown gear 42 is employed the teeth of which mesh with the teeth of the pinion 37. It will be observed that the crown gear 42 is rotatably mounted on a horizontal shaft 43 which extends at right angles to the axis of rotation of the shutter 36. Formed integrally with the crown gear 42 is a spur gear 43' which is arranged to drive a governor mechanism that is shown, generally, at 44 in Figure 4.

Figure 7:
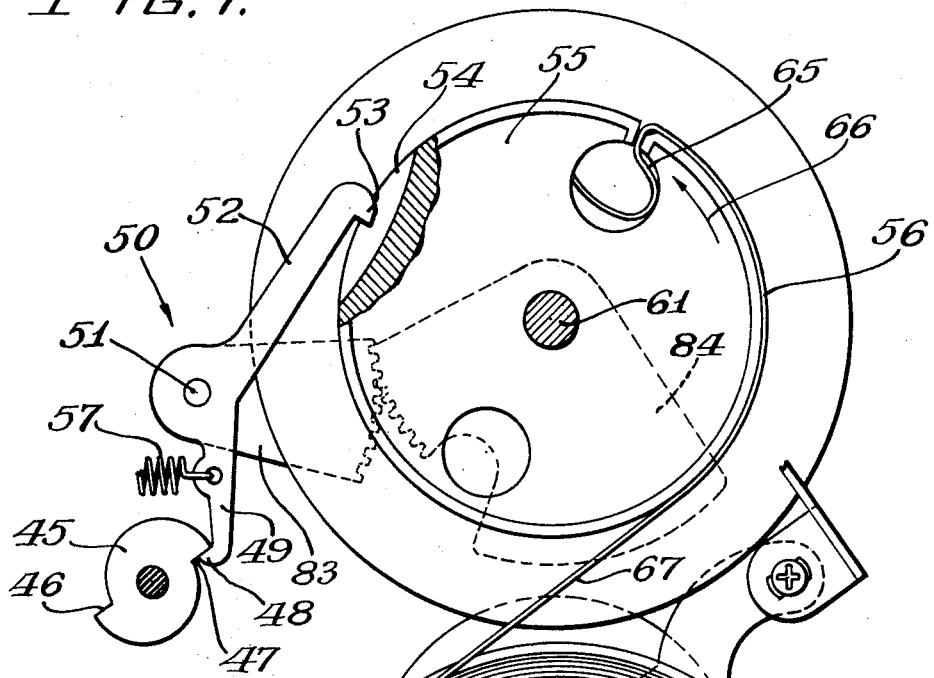
Figure 7 is a detached view showing the spring winding drums in elevation and certain of the related control parts.
Figure 8:
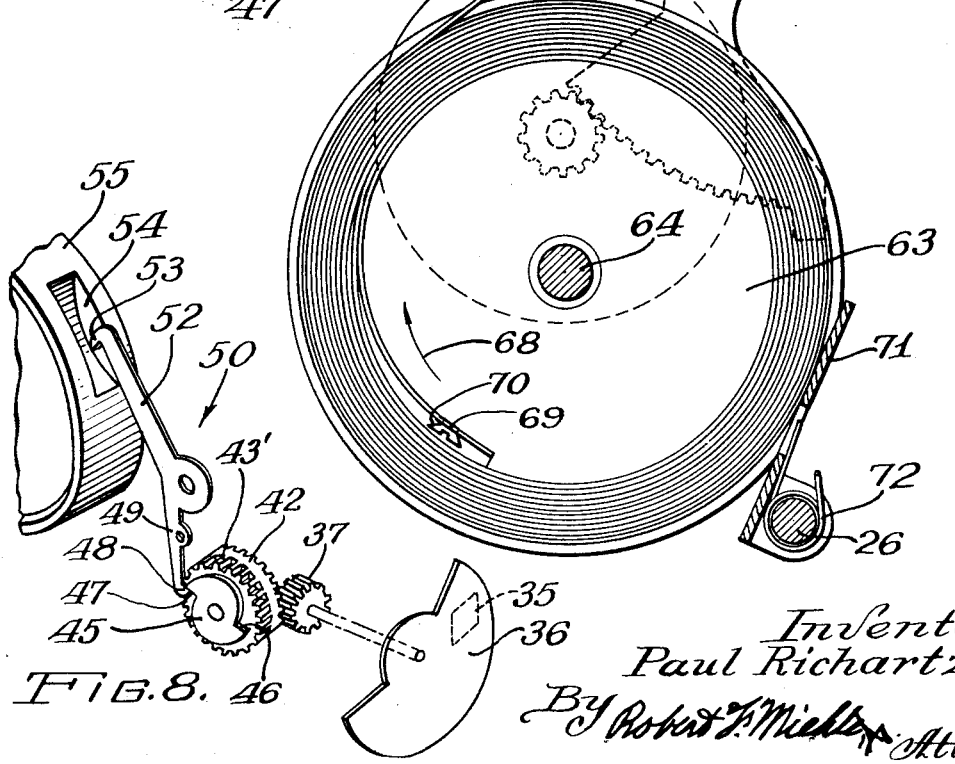
Figure 8 is a perspective view, somewhat diagrammatic in character, illustrating how the shutter is interlocked with the stop lever which prevents unwinding of the spring beyond a predetermined extent.

It is desirable to stop the shutter 36 in a position where it overlies or closes the aperture 35 when the spring drive mechanism, to be described, is unwound a predetermined extent. The reason for this of course is to prevent exposure of the frame of the film in registry with the aperture under such circumstances. For this purpose a stop disc 45 is mounted, as shown in Figure 8, for rotation conjointly with the crown gear 42 and spur gear 43' and it is provided with diametrically related stop shoulders 46 and 47 either of which can be engaged by a detent 48 that is carried by one arm 49 of a stop lever that is indicated, generally, at 50. The stop lever 50 is carried by and is rockable with a shaft 51, Figure 7, and its other arm 52 has a nose portion 53 that is arranged to enter a cavity 54 in an upper hub 55 that is located adjacent one side of the housing 11 and is arranged to have a spring strip 56 wound thereon. The stop lever 50 is biased so that the other arm 52 and particularly the nose portion 53 either enters the cavity 54 or engages the outer portion of the spring strip 56 as it is wound on the upper hub 55. The biasing action is provided by a coil tension spring 57 one end of which is secured, as shown in Figure 7, to the one arm 49, while the other end, as shown in Figure 6, is secured to an ear 58 that is formed integrally with the outer plate 25. The upper hub 55 is fast on and is rotatable with a shaft 61 that is journaled in the plates 24 and 25, as shown in Figure 2, and is provided with an externally operable crank arm 62 to permit winding of the spring strip 56 on the hub 55.

Below the upper hub 55 and mounted between the plates 24 and 25 is a lower hub 63 which also is located adjacent one side of the housing 11. The lower hub 63 is rotatable on a shaft 64 which is stationarily mounted between the plates 24 and 25 and which is positioned parallel to the shaft 61 carrying the upper hub 55. It will be observed that the stud 17 extends from the shaft 64. The upper and lower hubs 55 and 63 thus are mounted vertically spaced transverse axes in the housing 11.

As shown in Figure 7 one end 65 of the spring strip 56 is secured to the upper hub 55 which is rotated in the direction indicated by the arrow 66 to wind it thereon from the lower hub 63. The energy imparted to the upper hub 55 is the energy which is stored in the straight section 67 of the spring strip 56 interconnecting the portions thereof that are wound on the hubs 55 and 63. As the lower hub 63 rotates in the direction indicated by the arrow 68 the spring strip 56 is wound on the upper hub 55 by rotation of the crank 62. In effect, the spring strip 56 is a negator spring and, when fully wound on the upper hub 55 is so arranged that it seeks to be rewound on the lower hub 63. When the spring motor is fully charged, the spring strip 56 is completely wound upon the upper hub 55 and is entirely unwound from the lower hub 63.

The free end of the spring strip 56 is secured to the lower hub 63 by a screw 69 the head of which provides a detent 70 that is arranged, as indicated in Figure 1, to be engaged by one end of a stop finger 71 so as to prevent further winding of the spring strip 56 on the upper hub 55 when it has been substantially fully unwound from the lower hub 63. The stop finger 71 is rockably mounted on one of the pillars 26 and a spring 72 wrapped therearound serves to bias the stop finger 71 into engagement with the outermost turn of the spring strip 56 on the lower hub 63 and finally into engagement with the detent 70 in the position show in Figure 1.

Driving means, shown generally at 75 in Figure 1, is provided between the upper hub 55 and the crown gear 42. The driving means 75 comprises a gear train which includes a gear 76 that is driven by the upper hub 55 through a suitable ratchet connection. Thus, as the upper hub 55 rotates under the influence of the spring strip 56 in seeking to return to the lower hub 63, the gear 76 is rotated and, in turn, rotates a gear 77 that is rotatably mounted on a shaft 78. A somewhat larger gear 79 is provided for rotation conjointly with the gear 77 and it meshes with a pinion 80 that may be formed intgrally with or otherwise secured to the crown gear 42 for driving it and also for driving the stop disc 45. Thus, as the spring strip 56 unwinds from the upper hub 55 onto the lower hub 63, it drives through the gear train 75 to rotate the shutter 36 and at the same time, operate the shuttle 39 for advancing the film in synchronism with the opening and closing of the aperture 35.

It is desirable to indicate externally of the housing 11 the degree that the spring strip 56 is wound on the upper hub 55. Since the position of the stop lever 50 varies in accordance with the number of turns of the spring strip 56 on the upper hub 55, advantage is taken of this relationship to provide this indication. For this purpose a first gear sector 83, Figure 7, is mounted fast on the shaft 51 so that it rocks conjointly with the stop lever 50. Meshing with the first gear sector 83 is a second gear sector 84 which, as shown in Figure 2, is pivoted to rock about the same axis as the shaft 61. As shown in Figure 1 the second gear sector 84 carries an index 85 which is visible through a slot 86 that is located underneath a window 87 in the housing 11. The index 85 is movable with respect to a scale 88 which is calibrated suitably to indicate the degree that the spring strip 56 is wound on the upper hub 55. In Figure 1 it is shown as being fully wound thereon and completely unwound from the lower hub 63 to the extent permitted by the stop finger 71.

With a view to indicating the amount of unexposed film a film finger 91, Figures 1 and 6, is provided. Its upper end is arranged to engage the unexposed film that is still wound on the upper film reel 20, Figure 2. Near its lower end the film finger 91 is carried by a shaft 92 which extends through the plates 24 and 25 and is rockably mounted thereby. A spring 93, Figure 5, acts to bias the film finger 91 so as to hold it in engagement with the unexposed film on the upper film reel 20. At the other end of the shaft 92 is a gear sector 94, it being understood that the gear sector 94 rocks conjointly with the film finger 91. The gear sector 94 mesh with a pinion 95 which has secured thereto and rotatable therewith a disc 96. Along a portion of the periphery of the disc 96 is a scale 97 which can be moved past a slot 98 along which an index 99 is mounted to indicate with respect to the scale 97 the amount of film remaining on the upper film reel 20.

It will be understood that the unexposed film is unwound from the upper film reel 20 and is fed through the film chamber 32 past the aperture 35 where it is exposed in conventional manner and subsequently it is wound on the lower film reel 21. As pointed out hereinbefore, the drag spring 22 provides a sufficient retaining action to prevent the unexposed film from unwinding too rapidly from the upper film reel 20. The lower film reel 21 is driven by the spring strip 56 as it unwinds from the upper hub 55 to wind the exposed film onto the lower film reel 21. For this purpose, as shown in Figure 6, a pinion 100 is provided which meshes with the gear 76 that is driven through the ratchet by the upper hub 55. The pinion 100 also meshes with a gear 101 which drives the lower film reel 21 through a friction spring 102, Figure 2.

In operation the camera 10 is loaded, as indicated hereinbefore, by unscrewing the thumb nuts 14 and 15 and removing the cover 13. The unexposed film is carried by the upper film reel 20 and it is positioned over the upper film spindle 18. The lead end of the film is suitably threaded through the film chamber 32 and film feed mechanism in a manner well understood and then is wound on the lower film reel 21 sufficiently to permit it to be wound thereon as it is exposed when the camera 10 is operated. The cover 13 is replaced and the thumb nuts 14 and 15 secured in position.

The spring strip 56 is wound on the upper hub 55 by manual rotation of the crank 62. It can be fully wound thereon, as indicated in Figure 1, where further winding is prevented by engagement of the stop finger 71 with the detent 70. The degree that the spring strip 56 is wound on the upper hub 55 is indicated by the position of the index 85 which is controlled by the position of the stop lever 50.

As long as at least one turn of the spring strip 56 is wound on the upper hub 55, the cavity 54 is closed and the nose portion 53 merely rides on the outermost surface of the spring strip 56. However, when the spring strip 56 has been substantially fully unwound, the nose portion 53 no longer is held out of the cavity 54 and the spring 57 rocks and stop lever 50 to the position shown in Figure 7 where it engages one or the other of the stop shoulders 46 or 47. Previously, and as long as the nose portion 53 was held beyond the periphery of the upper hub 55, the detent 48 was held out of the path of either of the stop shoulders 46 or 47.

However, the arrangement is such that, when one or the other of the stop shoulders 46 or 47 is engaged by the detent 48, the shutter 36 is positioned, as shown in Figure 8, over the aperture 35. Thus, when the spring strip 56 is completely unwound from the upper hub 55, the construction is such that the aperture 35 will be closed. Thus, it is not possible to inadvertently expose one frame of the film.

As the exposed film winds on the lower film reel 21 and the unexposed film unwinds from the upper film reel 20, the film finger 91 moves inwardly and effects a corresponding movement of the gear sector 94 which, in turn, rotates the disc 96 to indicate through the slot 98 the amount of film remaining to be exposed.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub, means for preventing further unwinding of said spring strip from said upper hub when it has been unwound therefrom a predetermined extent, and means for stopping said exposing mechanism in closed position when said spring strip is prevented from being further unwound from said upper hub.

2. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub, detent means on the lower hub in a position to be uncovered by said spring strip as said strip becomes substantially fully unwound from the lower hub, and a stop finger urged against the portion of said spring strip on said lower hub and cooperating with said detent means for preventing complete unwinding of said spring strip from said lower hub while being wound on said upper hub.

3. The motion picture camera of claim 2 wherein said detent means comprises a screw securing said spring strip to said lower hub and having a head projecting above said spring strip and adapted to engage said stop finger.

4. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub, means for preventing further unwinding of said spring strip from said upper hub when it has been unwound therefrom a predetermined extent, means for stopping said exposing mechanism in closed position when said spring strip is prevented from being further unwound from said upper hub, and means cooperating with said upper hub for indicating externally of said housing the degree that said spring strip is wound on said upper hub.

5. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub, means for preventing further unwinding of said spring strip from said upper hub when it has been unwound therefrom a predetermined extent, means for stopping said exposing mechanism in closed position when said spring strip is prevented from being further unwound from said upper hub, means cooperating with said upper hub for indicating externally of said housing the degree that said spring strip is wound on said upper hub, and means cooperating with said lower hub for preventing complete unwinding of said spring strip therefrom while being wound on said upper hub.

6. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub; and means for preventing further unwinding of said spring strip from said upper hub when it has been unwound therefrom a predetermined extent including a stop lever pivoted intermediate its ends in said housing having one end biased toward said spring strip on said upper hub and a detent on the other end, and a rotatably mounted stop member driven by said upper hub and carrying a stop shoulder positioned in the path of said detent when said spring strip has been unwound to said predetermined extent for stopping further rotation of said upper hub.

7. The invention as set forth in claim 6 wherein the upper hub has a cavity in its peripheral surface arranged to be uncovered by the last turn of said spring strip thereon and the one end of the stop lever extends into said cavity to permit the detent to move into the path of the stop shoulder.

8. The invention as set forth in claim 6 wherein the film exposing mechanism includes means providing an aperture and a cooperating shutter driven in synchronism with the stop member in such manner that said shutter overlies said aperture when the detent engages the stop shoulder.

9. The invention as set forth in claim 6 wherein the stop member carries a second stop shoulder diametrically opposite the aforementioned stop shoulder with one or the other stop shoulder positioned in the path of the detent as aforesaid, and the film exposing mechanism includes means providing an aperture and a cooperating rotatable shutter driven in synchronism with said stop member in such manner that said shutter overlies said aperture when said detent engages either of said stop shoulders.

10. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub; means for preventing further unwinding of said spring strip from said upper hub when it has been unwound therefrom a predetermined extent including a stop lever pivoted intermediate its ends in said housing having one end biased toward said spring strip on said upper hub and a detent on the other end, and a rotatably mounted stop member driven by said upper hub and carrying a stop shoulder positioned in the path of said detent when said spring strip has been unwound to said predetermined extent for stopping further rotation of said upper hub; and means cooperating with said stop lever for indicating externally of said housing the degree that said spring strip is wound on said upper hub.

11. The invention as set forth in claim 10 wherein the indicating means includes a first gear sector movable with the stop lever and meshing with a second gear sector carrying an indicator visible through a window in the housing and movable relative to a scale carried thereby.

12. The invention as set forth in claim 11 wherein the film exposing mechanism includes means providing an aperture and a cooperating shutter driven in synchronism with the stop member in such manner that said shutter overlies said aperture when the detent engages the stop shoulder.

13. In a motion picture camera the combination with a vertically elongated housing, of a pair of rotatably mounted hubs within said housing adjacent one side thereof on vertically spaced transverse axes, a spring strip interconnecting said hubs and adapted to be wound on the upper hub and unwound from the lower hub and tending to return to said lower hub when wound on said upper hub whereby said upper hub is driven as a function of the resiliency of that portion of said spring strip between said hubs, a pair of film reel spindles disposed within said housing on vertically spaced transverse axes and adapted to carry film reels between said hubs and the other side of said housing, film feeding and exposing mechanism disposed intermediate the horizontal axial planes of said spindles, means for driving said film feeding and exposing mechanism and one of said film reel spindles from said upper hub, and means cooperating with said lower hub for preventing complete unwinding of said spring strip therefrom while being wound on said upper hub including a radially extending detent on said lower hub normally overlaid by said spring strip and arranged to be uncovered by the last turn thereof and a stop finger biased toward said spring strip on said lower hub for engaging said detent when it is uncovered to stop further rotation of said lower hub.

14. In a motion picture camera including a shutter, an intermittent film feed, a takeup spindle and a gear train for driving the shutter and feed in synchronism and also driving the spindle, the combination therewith of a driving hub, a takeup hub, a negator spring adapted to be wound on the driving hub and to tend to wind itself on the takeup hub and rotate the driving hub, coupling means drivingly interconnecting the gear train and the driving hub, feeler means biased against the spring on the driving hub, and latch means operable by the feeler means when only a predetermined length of the spring is left on the driving hub to latch the gear train against further movement to lock the driving hub against further unwinding rotation.

15. The motion picture camera of claim 14 wherein the driving hub has a recess in the periphery thereof adapted to permit movement of one end of the feeler means thereinto when the recess is uncovered by unwinding of a portion of the innermost coil of the spring on the driving hub, the other end of the feeler means having a hook portion, the gear train having a detent portion adapted to be engaged by the hook when said one end of the feeler means moves into the recess and being so positioned as to stop the shutter in a closed position.

16. The motion picture camera of claim 14 wherein the coupling means includes ratchet driving means adapted to permit the driving hub to be turned in a spring strip winding direction without driving the gear train and to drive the gear train when the driving hub is rotated in the opposite direction, and means for rotating the driving hub in the spring strip winding direction.

References Cited in the file of this patent

UNITED STATES PATENTS

| | | |
|---|---|---|
| 1,221,515 | Davidson | Apr. 3, 1917 |
| 1,265,699 | Thomas | May 7, 1918 |
| 1,926,703 | Spence | Sept. 12, 1933 |
| 2,013,288 | Porter | Sept. 3, 1935 |
| 2,063,799 | Fornelius et al. | Dec. 8, 1936 |
| 2,293,195 | Cohen | Aug. 18, 1942 |
| 2,377,750 | Briskin et al. | June 5, 1945 |
| 2,833,027 | Foster | May 6, 1958 |